(12) United States Patent
McMahon et al.

(10) Patent No.: US 8,489,860 B1
(45) Date of Patent: Jul. 16, 2013

(54) MOBILE ELECTRONIC DEVICE HAVING A HOST PROCESSOR SYSTEM CAPABLE OF DYNAMICALLY CANGING TASKS PERFORMED BY A COPROCESSOR IN THE DEVICE

(75) Inventors: Michael McMahon, Plano, TX (US);
Marion C. Lineberry, Dallas, TX (US);
Matthew A. Woolsey, Plano, TX (US);
Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/995,606

(22) Filed: Dec. 22, 1997

(51) Int. Cl.
*G06F 9/30* (2006.01)
(52) U.S. Cl.
USPC ............................................................ 712/34
(58) Field of Classification Search
USPC ...... 712/32, 33, 35, 34, 38, 29, 39, 31; 717/1, 717/2, 3, 4, 5; 707/36, 39, 227, 501, 503, 707/509, 104.1, 103.1, 27, 28, 103 Y, 103 X; 709/208, 227, 201, 218, 315, 316, 317, 332, 709/321; 713/191, 188; 775/222; 716/16, 716/17
See application file for complete search history.

(56) References Cited

U.S. PATENT DOCUMENTS

| | | | | |
|---|---|---|---|---|
| 4,727,545 A | * | 2/1988 | Glackemeyer et al. | 714/33 |
| 4,878,002 A | * | 10/1989 | Heatzig et al. | 318/568.2 |
| 5,287,515 A | * | 2/1994 | Murai et al. | 395/712 |
| 5,329,471 A | * | 7/1994 | Swoboda et al. | 703/23 |
| 5,339,422 A | * | 8/1994 | Brender et al. | 395/704 |
| 5,371,860 A | * | 12/1994 | Mura et al. | 395/325 |
| 5,471,612 A | * | 11/1995 | Schlafly | 707/104 |
| 5,559,548 A | * | 9/1996 | Davis et al. | 348/6 |
| 5,577,250 A | * | 11/1996 | Anderson et al. | 395/670 |
| 5,613,098 A | * | 3/1997 | Landau et al. | 395/500 |
| 5,748,650 A | * | 5/1998 | Blaker et al. | 714/786 |
| 5,768,593 A | * | 6/1998 | Walters et al. | 395/705 |
| 5,771,275 A | * | 6/1998 | Brunner et al. | 379/67 |
| 5,826,039 A | * | 10/1998 | Jones | 709/206 |
| 5,892,966 A | * | 4/1999 | Petrick et al. | 712/36 |
| 5,923,892 A | * | 7/1999 | Levy | 712/31 |
| 5,953,741 A | * | 9/1999 | Evoy et al. | 711/132 |
| 5,961,586 A | * | 10/1999 | Pedersen | 709/201 |
| 6,003,065 A | * | 12/1999 | Yan et al. | 709/201 |
| 6,009,507 A | * | 12/1999 | Brooks et al. | 712/28 |
| 6,029,000 A | * | 2/2000 | Woolsey et al. | 717/147 |
| 6,075,863 A | * | 6/2000 | Krishnan | 713/191 |

(Continued)

OTHER PUBLICATIONS

Yuchi Nakao, Java on M32R/D, Sun's Worldwide Java Developer Conference, CA, May 1996.*

(Continued)

*Primary Examiner* — Robert Fennema
(74) *Attorney, Agent, or Firm* — Ronald O. Neerings; Wade James Brady, III; Frederick J. Telecky, Jr.

(57) ABSTRACT

A wireless data platform comprises a plurality of processors. Channels of communication are set up between processors such that they may communicate information as tasks are performed. A dynamic cross compiler executed on one processor compiles code into native processing code for another processor. A dynamic cross linker links the compiled code for other processor. Native code may also be downloaded to the platform through use of a JAVA Bean (or other language type) which encapsulates the native code. The JAVA Bean can be encrypted and digitally signed for security purposes.

46 Claims, 3 Drawing Sheets

U.S. PATENT DOCUMENTS 6,078,736 A * 6/2000 Guccione .................... 716/16
6,173,438 B1 * 1/2001 Kodosky et al. ............ 717/109
6,330,659 B1 * 12/2001 Poff et al. .................. 712/34

OTHER PUBLICATIONS

Mamoru Sakamoto, M32R/D in Silicon , Sun's Worldwide Java Developer Conference, CA, May 1996.*

Eric Ngyuen, Java based Devices from Mitsumishi, Sun's Worldwide Java Developer Conference, CA, May 1996.*

Brook Crothers, "Mitsumishi Shows Off Java Chips", News.com, May 1996.*

Hoff, Arthur. "Java and Internet Programming". Aug. 1, 1995. pp. 1-5. Obtained via http://www.ddj.com/web-development/184409607.*

Business Wire: "Ericsson annonunces its M2190 OEM Wireless Modem, first PCMCIA modem for mobile data connectivity". Nov. 2, 1994. pp. 1-7.*

Goodman, David. Holtzman, Jack. "Packet Communication Technology for Advanced Wireless Networks". 1990, pp. 1-6.*

Schwartz, J.P. et al. "OPAL: A High Level Language and Environment for DSP Boards on PC". 4 pages, 1989.*

* cited by examiner

MOBILE ELECTRONIC DEVICE HAVING A HOST PROCESSOR SYSTEM CAPABLE OF DYNAMICALLY CANGING TASKS PERFORMED BY A COPROCESSOR IN THE DEVICE

CROSS-REFERENCE TO RELATED APPLICATIONS

This application is related U.S. Ser. No. 08/995,600 entitled "Mobile Communication System with Cross Compiler and Cross Linker" to Woolsey et al, now U.S. Pat. No. 6,029,000, U.S. Ser. No. 08/995,597, entitled Method and Apparatus for Providing Downloadable Functionality to an Embedded Coprocessor" to Brewer, now U.S. Pat. No. 6,295,645, and U.S. Ser. No. 08/995,603, entitled Method and Apparatus for Extending Security Model to Native Code" to Brewer, now U.S. Pat. No. 6,219,787, all filed on even date herewith and incorporated by reference herein.

STATEMENT OF FEDERALLY SPONSORED RESEARCH OR DEVELOPMENT

Not Applicable

BACKGROUND OF THE INVENTION

1. Technical Field

This invention relates in general to mobile electronic devices and, more particularly, to a hardware and software platform for mobile electronic devices.

2. Description of the Related Art

Handheld portable devices are gaining popularity as the power and, hence, functionality of the devices increases. Personal Digital Assistants (PDAs) are currently in widespread use and Smartphones, which combine the some of the capabilities of a cellular phone and a PDA, are expected to have a significant impact on communications in the near future.

Some devices currently incorporate one or more DSPs (digital signal processor) or other coprocessors for providing certain discrete features, such as voice recognition, and a general purpose processor for the other data processing functions. The code for the DSP and the code for the general purpose processor is generally stored in ROMs or other non-volatile memories, which are not easily modified. Thus, as improvements and new features become available, it is often not possible to upgrade the capabilities of the device. In particular, it is not possible to maximize the use of the DSPs or other coprocessor which may be present in the device.

Therefore, a need exists for a data processing architecture which can be upgraded and optimizes use of multiple processors and coprocessors.

BRIEF SUMMARY OF THE INVENTION

In the present invention, a mobile electronic device comprises a coprocessor for executing native code, a host processor system operable to execute native code corresponding to the host processor system and processor independent code. The host processor system is operable to dynamically change the tasks performed by the digital signal coprocessor. Communication circuitry provides for communication between the host processor system and the coprocessor.

The present invention provides significant advantages over the prior art. Because the host processor system can dynamically allocate the tasks being performed by the coprocessor, which may be a digital signal processor, to fully use the coprocessor. The host processor system may direct a routine to one of a plurality of coprocessors, depending upon a variety of factors, such the present capabilities of each processor.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-6 of the drawings, like numerals being used for like elements of the various drawings.

Figure 1:
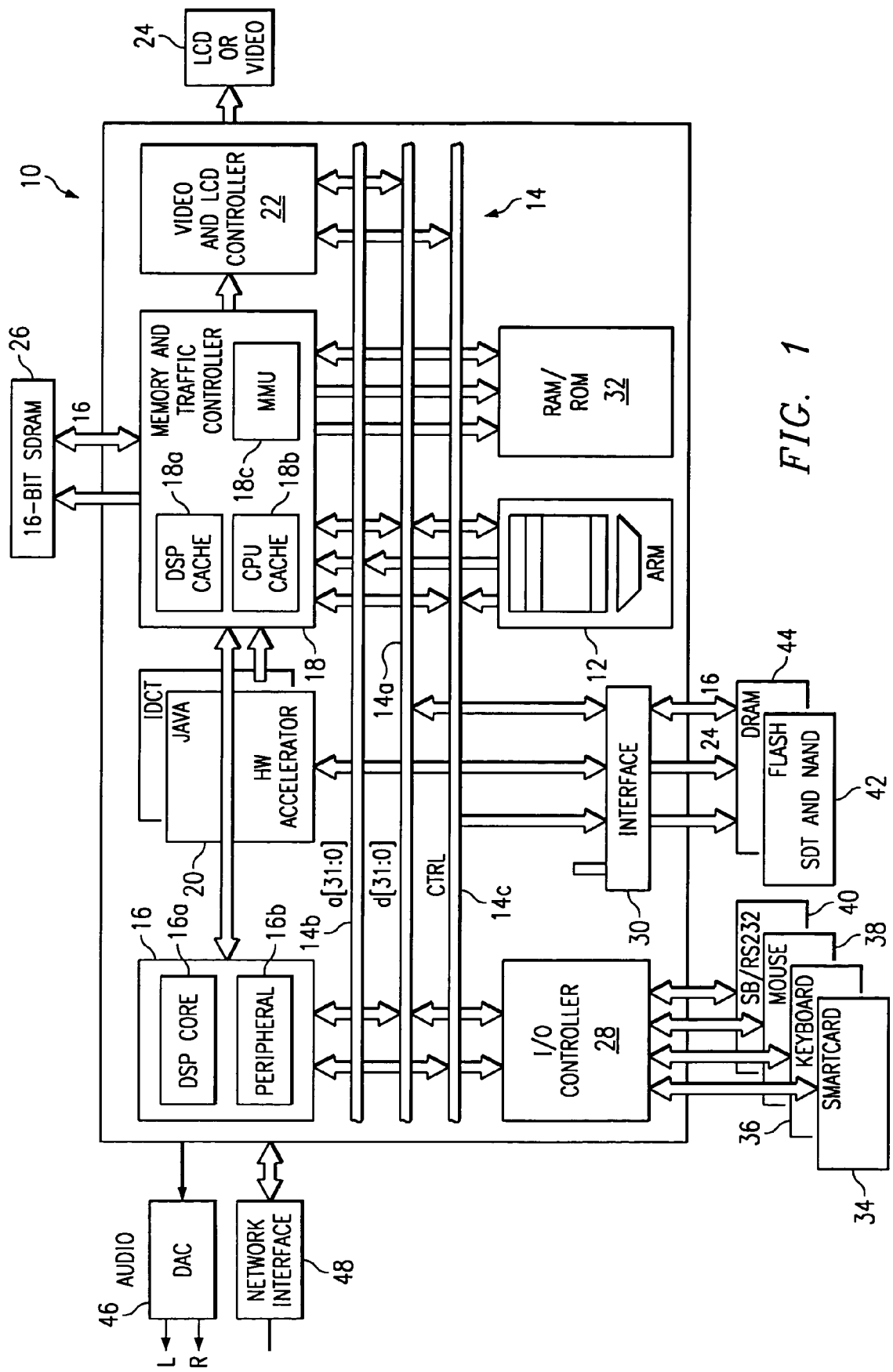
FIG. 1 illustrates a block diagram of a platform architecture particularly suited for general wireless data processing.

FIG. 1 illustrates a preferred embodiment of a general wireless data platform architecture, which could be used for example, in the implementation of a Smartphone or PDA. The wireless data platform 10 includes a general purpose (Host) processor 12 coupled to bus structure 14, including data bus 14a, address bus 14b and control bus 14c. One or more DSPs (or other coprocessors) 16, including the core processor 16a and the peripheral interface 16b, are coupled to bus 14 and to memory and traffic controller 18, which includes a DSP cache memory 18a, a CPU cache 18b, and a MMU (memory management unit) 18c. A hardware accelerator circuit 20 (for accelerating a portable language such as JAVA) and a video and LCD controller 22 are also coupled to the memory and traffic controller 18. The output of the video and LCD controller is coupled to a LCD or video display 24.

Memory & traffic controller 18 is coupled to bus 14 and to the main memory 26, shown as an SDRAM (synchronous dynamic random access memory). Bus 14 is also connected to I/O controller 28, interface 30, and RAM/ROM 32. A plurality of devices could be coupled to the wireless data platform 10, such as smartcard 34, keyboard 36, mouse 38, or one or more serial ports 40, such as a USB (universal serial bus) port or an RS232 serial port. Interface 30 can couple to a flash memory card 42 and/or a DRAM card 44. The peripheral interface 16b can couple the DSP 16 to a DAC (digital to analog converter) 46, a network interface 48 or to other devices.

The wireless data platform 10 of FIG. 1 utilizes both a general purpose processor 12 and a DSP 16. Unlike current devices in which the DSP 16 is dedicated to specific fixed functions, the DSP 16 of FIG. 1 can be used for any number of functions. This allows the user to derive the full benefit of the DSP 16.

One main area in which the DSP 16 can be used is in connection with the man-machine interface (MMI). Importantly, functions like speech recognition, image and video compression and decompression, data encryption, text-to-speech conversion, and so on, can be performed much more efficiently using the DSP 16. The present architecture allows new functions and enhancements to be easily added to wireless data platform 10.

It should be noted that the wireless data platform 10 is a general block diagram and many modifications could be made. For example, FIG. 1 illustrates separate DSP and processor caches 18a and 18b. As would be known to one skilled in the art, a unified cache could also be used. Further, the hardware acceleration circuit 20 is an optional item. Such devices speed the execution of languages such as JAVA; however, the circuit is not necessary for operation of the device. Further, although the illustrated embodiment shows a single DSP, multiple DSPs (or other coprocessors) could be coupled to the buses.

Figure 2:
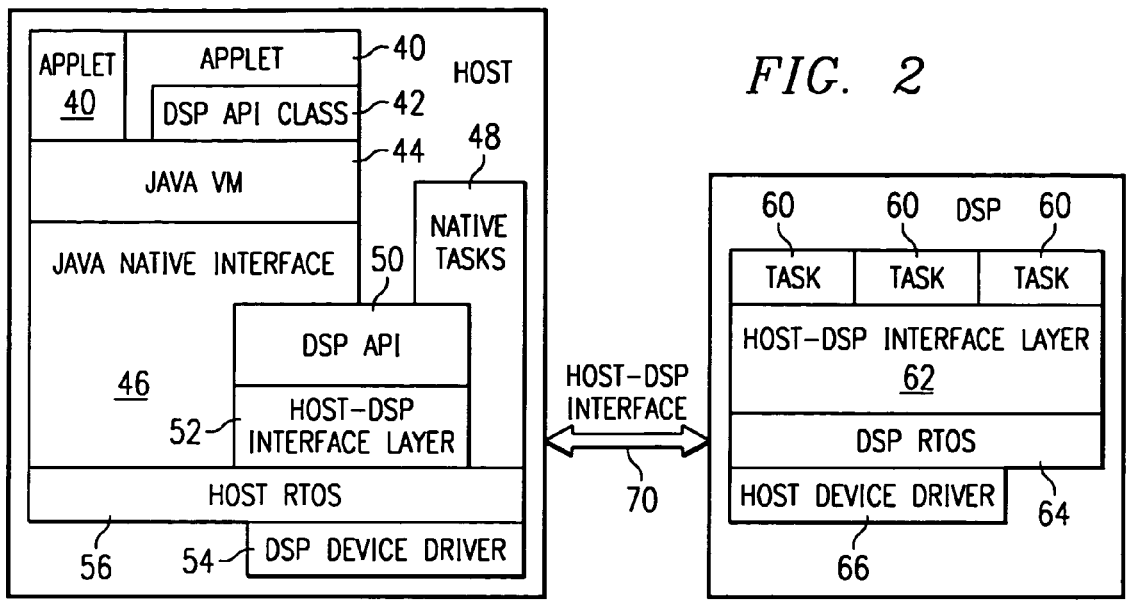
FIG. 2 illustrates a functional block diagram of the platform of FIG. 1.

FIG. 2 illustrates a functional software architecture for the wireless data platform 10. This block diagram presumes the use of JAVA; it should be noted that languages other than JAVA could be used as well. Functionally, the software is divided into two groups, Host processor software and DSP software. The Host software includes one or more applets 40. The DSP API class 42 is a JAVA API package for JAVA applications or applets to access the functionality of the DSP API 50 and Host DSP Interface Layer 52. A JAVA virtual machine (VM) 44 interprets the applets. The JAVA native interface 46 is the method which the JAVA VM executes host processor or platform specific code. Native tasks 48 are non-JAVA programs which can be executed by the Host processor 12 without using the JAVA native interface. The DSP API 50, described in greater detail hereinbelow, is an API (application program interface) used the Host 12 to call to make use of the capabilities of the DSP 16. The Host-DSP Interface Layer 52 provides an API for the Host 12 and DSP 16 to communicate with each other, with other tasks, or other hardware using channels via the Host-DSP Communication Protocol. The DSP device driver 54 is the Host based device driver for the Host RTOS 56 (real time operating system) to communicate with the DSP 16. The Host RTOS 56 is an operating system, such as NUCLEUS PLUS by Accelerated Technology Incorporated. Alternatively a non-real time operating system, such as WINDOWS CE by Microsoft Corporation, could be used. The DSP Library 58 contains programs stored for execution on the DSP 16.

On the DSP side, one or more tasks 60 can be stored in memory for execution by the DSP 16. As described below, the tasks can be moved in and out of the memory as desired, such that the functionality of the DSP is dynamic, rather than static. The Host-DSP Interface layer 62 on the DSP side performs the same function as the Host-DSP Interface layer 52 on the Host side, namely it allows the Host 12 and DSP 16 to communicate. The DSP RTOS 64 is the operating system for the DSP processor. The Host Device driver 66 is a DSP based device driver for the DSP RTOS 64 to communicate with the Host 12. The Host-DSP Interface 70 couples the DSP 16 and Host 12.

In operation, the software architecture shown in FIG. 2 uses the DSP 16 as a variable function device, rather than a fixed function device as in the prior art. Accordingly, the DSP functions can be downloaded to the mobile device incorporating the architecture of FIG. 2 to allow the DSP 16 to perform various signal processing functions for the Host 12.

DSP-API

The DSP-API provides a device independent interface from the Host 12 to the DSP 16. The functions provide the Host 12 with the ability to load and schedule tasks on the DSP 16 and to control and communicate with those tasks. The API functions include calls to: determine the DSP's available resources, create and control Host 12 and DSP tasks, create and control data channels between Host 12 and DSP tasks, and communicate with tasks. These functions are described below. Each function returns a BOOLean result, which will be SUCCESS for a successful operation, or FAILURE. If the result is FAILURE, the errcode should be checked to determine which error occurred.

DSP_Get_MIPS
BOOL DSP_Get_MIPS(T_DeviceID DevID, U32*mips, U16*errcode);

This function returns the current MIPS available on the DSP. This consists of the MIPS capability of the DSP 16 minus a base MIPS value (the MIPS value with no additional dynamic tasks, i.e. the kernel plus API code plus drivers), minus the sum of the MIPS ratings for all loaded dynamic tasks. The errcode parameter will contain the following possible results:
DSP_SUCCESS
DSP_DEVID_NOT_FOUND
DSP_DEVID_NOT_RESPONDING
DSP_Get_Memory_Available
BOOL DSP_Get_Memory_Available(T_DeviceID DevID, T_Size *progmemo, T_Size *datamem, U16*errcode);

This function will query the DSP 16 specified by DevID for the amounts of available memory for both program memory and data memory. The resultant values are returned in the progmem and datamem parameters. The sizes are specified in T_DSP_Words. The errcode parameter will contain the following possible results:
DSP_SUCCESS
DSP_DEVID_NOT_FOUND
DSP_DEVID_NOT_RESPONDING
DSP_Alloc_Mem
BOOL DSP_Alloc_Mem(T_DeviceID DevID, U16 mempage, T_Size size, T_DSP_Word **memptr, U16*errcode);

This function will allocate a block of memory on a DSP 16. The DevID specifies which device on which to allocate the memory. The mempage is 0 for program space, and 1 for data space. The size parameter specifies the memory block size in T_DSP_Words. The returned memptr will be a pointer to the memory block on the DSP 16, or NULL on failure. The errcode parameter will contain the following possible results:
DSP_SUCCESS
DSP_DEVID_NOT_FOUND
DSP_DEVID_NOT_RESPONDING
DSP_INVALID_MEMPAGE
DSP_NOT_ENOUGH_MEMORY
DSP_Free_Mem
BOOL DSP_Free_Mem(T_DeviceID DevID, U16 mempage, T_DSP_Word *memptr, U16*errcode);

This function will free a block of memory on a DSP that was allocated with the DSP_Alloc_Mem function. The DevID specifies on which device the memory resides. The mempage is 0 for program space, and 1 for data space. The memptr parameter is the pointer to the memory block. The errcode parameter will contain the following possible results:
DSP_SUCCESS
DSP_DEVID_NOT_FOUND
DSP_DEVID_NOT_RESPONDING
DSP_INVALID_MEMPAGE
DSP_MEMBLOCK_NOT_FOUND
DSP_Get_Code_Info
BOOL DSP_Get_Code_Info(char *Name, T_CodeHdr *codehdr, U16*errcode);

This function will access the DSP Library table and return the code header for the DSP function code specified by the Name parameter. On return, the location pointed to by the codehdr parameter will contain the code header information. The errcode parameter will contain the following possible results:
    DSP_SUCCESS
    DSP_NAMED_FUNC_NOT_FOUND
    DSP_Link_Code
    BOOL DSP_Link_Code(T_DeviceID DevID, T_CodeHdr *codehdr, T_TaskCreate *tcs, U16*errcode);

This function will link DSP function code so that it will run at a specified address on the DSP specified by DevID. The codehdr parameter points to the code header for the function. The dynamic cross linker will link the code based on information in the code header, and in the code (COFF file). The dynamic cross linker will allocate the memory as needed, and link and load the code to the DSP 16. The tcs parameter is a pointer to the task creation structure needed in the DSP_Create_Task function. DSP_Link_Code will fill in the code entry points, priority, and quantum fields of the structure in preparation for creating a task. The errcode parameter will contain the following possible results:
    DSP_SUCCESS
    DSP_DEVID_NOT_FOUND
    DSP_DEVID_NOT_RESPONDING
    DSP_NOT_ENOUGH_PROG_MEMORY
    DSP_NOT_ENOUGH_DATA_MEMORY
    DSP_COULD_NOT_LOAD_CODE
    DSP_Put_BLOB
    BOOL DSP_Put_BLOB(T_DeviceID DevID, T_HostPtr srcaddr, T_DSP_Ptr destaddr, U16 mempage, T_Size size, U16*errcode);

This function will copy a specified Binary Large Object (BLOB) to the DSP 16. The DevID specifies on which DSP 16 to copy the object. The srcaddr parameter is a pointer to the object in Host memory. The destaddr is a pointer to the location to which to copy the object on the DSP 16. The mempage is 0 for program space, and 1 for data space. The size parameter specifies the size of the object in T_DSP_Words. The errcode parameter will contain the following possible results:
    DSP_SUCCESS
    DSP_DEVID_NOT_FOUND
    DSP_DEVID_NOT_RESPONDING
    DSP_INVALID_MEMPAGE
    DSP_Create_Task
    BOOL DSP_Create_Task(T_DeviceID DevID, T_TaskCreate *tcs, T_TaskID *TaskID, U16*errcode);

DSP_Create_Task requests the DSP 16 to create a task given the task parameters and the code locations in the DSP's program space. The Task Creation Structure is show in Table 1:

TABLE 1

Task Creation Structure.

| Data Type | Field Name | Description |
|---|---|---|
| T_DSP_Name | Name | User defined name for the task. |
| U32 | MIPS | MIPS used by the task. |
| T_ChanID | ChanIn | The channel ID used for task input. |
| T_ChanID | ChanOut | The channel ID used for task output. |
| T_StrmID | StrmIn | The stream ID used for task input. |
| T_StrmID | StrmOut | The stream ID used for task output. |
| U16 | Priority | The task's priority. |
| U32 | Quantum | The task's timeslice in system ticks. |
| T_Size | StackReq | The amount of stack required. |

TABLE 1-continued

Task Creation Structure.

| Data Type | Field Name | Description |
|---|---|---|
| T_DSP_Ptr | MsgHandler | Pointer to code to handle messages to the task. |
| T_HOST_Ptr | CallBack | Pointer to Host code to handle messages from the task. |
| T_DSP_Ptr | Create | Pointer to code to execute when task is created. |
| T_DSP_Ptr | Start | Pointer to code to execute when task is started. |
| T_DSP_Ptr | Suspend | Pointer to code to execute when task is suspended. |
| T_DSP_Ptr | Resume | Pointer to code to execute when task is resumed. |
| T_DSP_Ptr | Stop | Pointer to code to execute when task is stopped. |

Once the task is created, the Create entry point will be called, giving the task the opportunity to do any necessary preliminary initialization. The Create, Suspend, Resume, and Stop entry points can be NULL. The resultant TaskID contains both the device ID (DevID), and the DSP's task ID. If the TaskID is NULL, the create failed. The errcode parameter will contain the following possible results:
    DSP_SUCCESS
    DSP_DEVID_NOT_FOUND
    DSP_DEVID_NOT_RESPONDING
    DSP_INVALID_PRIORITY
    DSP_CHANNEL_NOT_FOUND
    DSP_ALLOCATION_ERROR
    DSP_Start_Task
    BOOL DSP_Start_Task(T_TaskID TaskID, U16*errcode);

This function will start a DSP task specified by TaskID. Execution will begin at the task's Start entry point. The errcode parameter will contain the following possible results:
    DSP_SUCCESS
    DSP_DEVID_NOT_FOUND
    DSP_DEVID_NOT_RESPONDING
    DSP_TASK_NOT_FOUND
    DSP_Suspend_Task
    BOOL DSP_Suspend_Task(T_TaskID TaskID, U16*errcode);

This function will suspend a DSP task specified by TaskID. Prior to being suspended, the task's Suspend entry point will be called to give the task a chance to perform any necessary housekeeping. The errcode parameter will contain the following possible results:
    DSP_SUCCESS
    DSP_DEVID_NOT_FOUND
    DSP_DEVID_NOT_RESPONDING
    DSP_TASK_NOT_FOUND
    DSP_Resume_Task
    BOOL DSP_Resume_Task(T_TaskID TaskID, U16*errcode);

This function will resume a DSP task that was suspended by DSP_Suspend_Task. Prior to being resumed, the task's Resume entry point will be called to give the task a chance to perform any necessary housekeeping. The errcode parameter will contain the following possible results:
    DSP_SUCCESS
    DSP_DEVID_NOT_FOUND
    DSP_DEVID_NOT_RESPONDING
    DSP_TASK_NOT_FOUND DSP_TASK_NOT_SUSPENDED
DSP_Delete_Task
    BOOL DSP_Delete_Task(T_TaskID TaskID, U16*errcode);
    This function will delete a DSP task specified by TaskID. Prior to the deletion, the task's Stop entry point will be called to give the task a chance to perform any necessary cleanup. This should include freeing any memory that was allocated by the task, and returning any resources the task acquired. The errcode parameter will contain the following possible results:
    DSP_SUCCESS
    DSP_DEVID_NOT_FOUND
    DSP_DEVID_NOT_RESPONDING
    DSP_TASK_NOT_FOUND
DSP_Change_Task_Priority
    BOOL DSP_Change_Task_Priority(T_TaskID TaskID, U16 newpriority, U16 *oldpriority, U16*errcode);
    This function will change the priority of a DSP task specified by TaskID. The priority will be changed to newpriority. The possible values of newpriority are RTOS dependent. Upon return, the oldpriority parameter will be set to the previous priority of the task. The errcode parameter will contain the following possible results:
    DSP_SUCCESS
    DSP_DEVID_NOT_FOUND
    DSP_DEVID_NOT_RESPONDING
    DSP_TASK_NOT_FOUND
    DSP_INVALID_PRIORITY
DSP_Get_Task_Status
    BOOL DSP_Get_Task_Status(T_TaskID TaskID, U16*status, U16*priority, T_ChanID *Input, T_ChanID *Output U16*errcode);
    This function returns the status for a DSP task specified by TaskID. The status will be one of the following values:
    DSP_TASK_RUNNING
    DSP_TASK_SUSPENDED
    DSP_TASK_WAITFOR_SEM
    DSP_TASK_WAITFOR_QUEUE
    DSP_TASK_WAITFOR_MSG
    The priority parameter will contain the task's priority, and the Input and Output parameters will contain the task's input and output channel IDs, respectively. The errcode parameter will contain the following possible results:
    DSP_SUCCESS
    DSP_DEVID_NOT_FOUND
    DSP_DEVID_NOT_RESPONDING
    DSP_TASK_NOT_FOUND
DSP_Get_ID_From_Name
    BOOL DSP_Get_ID_From_Name(T_DeviceID DevID, T_DSP_Name Name, T_DSP_ID *ID, U16*errcode);
    This function returns the ID for a named object on the DSP 16. The named object may be a channel, a task, a memory block, or any other supported named DSP object. The errcode parameter will contain the following possible results:
    DSP_SUCCESS
    DSP_DEVID_NOT_FOUND
    DSP_DEVID_NOT_RESPONDING
    DSP_NAME_NOT_FOUND
DSP_Dbg_Read_Mem
    BOOL DSP_Dbg_Read_Mem(DEVICE_ID DevID, U8 mempage, DSP_PTR addr, U32 count, DSP_WORD *buf, U16*errcode);
    This function requests a block of memory. The mempage specifies program memory (0) or data memory (1). The addr parameter specifies the memory starting address, and the count indicates how many T_DSP_Words to read. The buf parameter is a pointer to a caller provided buffer to which the memory should be copied. The errcode parameter will contain the following possible results:
    DSP_SUCCESS
    DSP_DEVID_NOT_FOUND
    DSP_DEVID_NOT_RESPONDING
    DSP_INVALID_MEMPAGE
DSP_Dbg_Write_Mem
    BOOL DSP_Dbg_Write_Mem(T_DeviceID DevID, U16 mempage, T_DSP_Ptr addr, T_Count count, T_DSP_Word *buf, U16*errcode);
    This function writes a block of memory. The mempage specifies program memory (0) or data memory (1). The addr parameter specifies the memory starting address, and the count indicates how many T_DSP_Words to write. The buf parameter is a pointer the buffer containing the memory to write. The errcode parameter will contain the following possible results:
    DSP_SUCCESS
    DSP_DEVID_NOT_FOUND
    DSP_DEVID_NOT_RESPONDING
    DSP_INVALID_MEMPAGE
DSP_Dbg_Read_Reg
    BOOL DSP_Dbg_Read_Reg(T_DeviceID DevID, U16 RegID, T_DSP_Word *regvalue, U16*errcode);
    This function reads a DSP register and returns the value in regvalue. The RegID parameter specifies which register to return. If the RegID is −1, then all of the register values are returned. The regvalue parameter, which is a pointer to a caller provided buffer, should point to sufficient storage to hold all of the values. The register IDs are DSP specific and will depend on a particular implementation. The errcode parameter will contain the following possible results:
    DSP_SUCCESS
    DSP_DEVID_NOT_FOUND
    DSP_DEVID_NOT_RESPONDING
    DSP_INVALID_REGISTER
DSP_Dbg_Write_Reg
    BOOL DSP_Dbg_Write_Reg(T_DeviceID DevID, U16 RegID, T_DSP_Word regvalue, U16*errcode);
    This function writes a DSP register. The RegID parameter specifies which register to modify. regvalue contains the new value to write. The register IDs are DSP specific and will depend on a particular implementation. The errcode parameter will contain the following possible results:
    DSP_SUCCESS
    DSP_DEVID_NOT_FOUND
    DSP_DEVID_NOT_RESPONDING
    DSP_INVALID_REGISTER
DSP_Dbg_Set_Break
    BOOL DSP_Dbg_Set_Break(T_DeviceID DevID, DSP_Ptr addr, U16*errcode);
    This function sets a break point at the given code address (addr). The errcode parameter will contain the following possible results:
    DSP_SUCCESS
    DSP_DEVID_NOT_FOUND
    DSP_DEVID_NOT_RESPONDING
DSP_Dbg_Clr_Break
    BOOL DSP_Dbg_Clr_Break(T_DeviceID DevID, T_DSP_Ptr addr, U16 *errcode);
    This function clears a break point that was previously set by DSP_Dbg_Set_Break at the given code address (addr). The errcode parameter will contain the following possible results:
    DSP_SUCCESS
    DSP_DEVID_NOT_FOUND
    DSP_DEVID_NOT_RESPONDING
    DSP_BP_DID_NOT_EXIST

DSP DEVICE DRIVER

The DSP Device Driver 54 handles communications from the Host 12 to the DSP 16. The driver functions will take the communication requests as specified in the Host-DSP Communications Protocol and handle the transmission of the information via the available hardware interface. The device driver is RTOS dependent and communications hardware dependent.

DSP LIBRARY

The DSP Library 58 contains the blocks of code that can be downloaded to the DSP 16 for execution. Each block of code will be previously unlinked, or relocatably linked as a library, so that the dynamic cross linker can resolve all address references. Each code block will also include information about the block's requirements for DSP MIPS (millions of instructions per second), priority, time slice quantum, and memory. The format for the code block header is shown in Table 2. The program memory and data memory sizes are approximations to give the Host 12 a quick check on whether the DSP can support the task's memory requirements. If there appears to be sufficient space, the dynamic cross linker can then attempt to link and load the code. It should be noted that the dynamic cross linker could still fail, due to page alignment and contiguity requirements. In the preferred embodiment, the code is in a version 2 COFF file format.

TABLE 2

Code Block Header.

| Data Type | Field Name | Description |
| --- | --- | --- |
| U16 | Processor | The target processor type. |
| T_DSP_Name | Name | Task's name. |
| U32 | MIPS | Worst case MIPS required by the task. |
| T_Size | ProgSize | Total program memory size needed. |
| T_Size | DataSize | Total data memory size needed. |
| T_Size | InFrameSize | Size of a frame in the task's input channel. |
| T_Size | OutFrameSize | Size of a frame in the task's output channel. |
| T_Size | InStrmSize | Size of the task's input stream FIFO. |
| T_Size | OutStrmSize | Size of the task's output stream FIFO. |
| U16 | Priority | Task's priority. |
| U32 | Quantum | Task's time slice quantum (number of system ticks). |
| T_Size | StackReq | Stack required. |
| T_Size | CoffSize | Total size of the COFF file. |
| T_DSP_Ptr | MsgHandler | Offset to a message handler entry point for the task. |
| T_DSP_Ptr | Create | Offset to a create entry point that is called when the task is created. |
| T_DSP_Ptr | Start | Offset to the start of the task's code. |
| T_DSP_Ptr | Suspend | Offset to a suspend entry point that is called prior to the task being suspended. |
| T_DSP_Ptr | Resume | Offset to a resume entry point that is called prior to the task being resumed. |
| T_DSP_Ptr | Stop | Offset to a stop entry point that is called prior to the task being deleted. |
| T_Host_Ptr | CoffPtr | Pointer to the location of the COFF data in the DSP Library. |

Conversion of Portable Code into Linked Target Code

Figure 3:
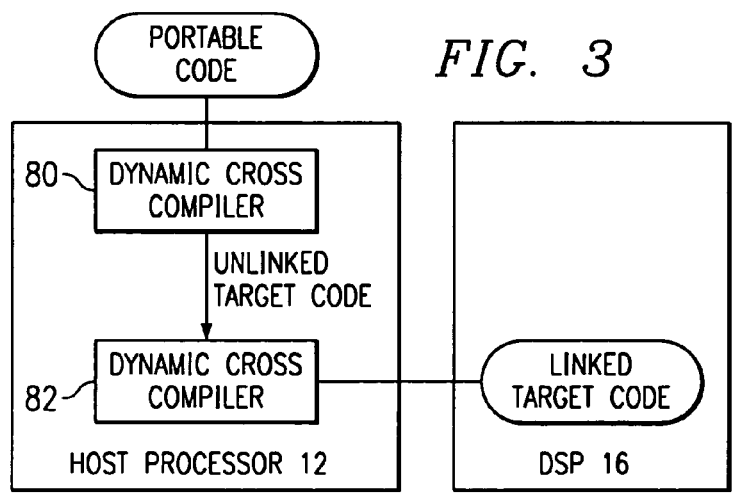
FIG. 3 illustrates a functional block diagram of dynamic cross compiling and dynamic cross linking functions.

A procedure for converting portable (processor independent) code, such as JAVA code, into linked target code is shown in FIG. 3. The procedure uses two functions, a dynamic cross compiler 80 and a dynamic cross linker 82. Each function is implemented on the host processor 12. The dynamic cross linker is part of the DSP-API in the preferred embodiment. The cross compiler may also be part of the DSP-API.

The dynamic cross compiler 80 converts portable code into unlinked, executable target processor code. The dynamic cross linker 82 converts the unlinked, executable target processor code into linked, executable target processor code. To do so, it must resolve addresses within a block of code, prior to loading on the DSP 16. The dynamic cross linker 82 links the code segments and data segments of the function, allocates the memory on the DSP 16, and loads the code and constant data to the DSP 16. The functions are referred to as "cross" compiling and "cross" linking, because the functions (compiling and linking) occur on a different processor (i.e., the host processor 12) from the target processor which executes the code (i.e., the DSP 16).

The dynamic cross compiler 80 accepts previously unlinked code loaded on demand by a user or a user agent (such as a browser). The code is processed to either (1) identify "tagged" sections of the code or (2) analyze untagged code segments for suitability of execution on the DSP 16. A tagged section of source code could delineate source targetable to a DSP by predetermined markers such as "<start DSP code>" and "<end DSP code>" embedded in the source code. If a tagged section is identified either directly or through analysis, a decision is made to either cross compile or not based on the current processing state of the DSP 16. If a decision is made to compile, the section of code processed by compiling software that outputs unlinked, executable target processor code, using well known compiling methods. A decision not to compile could be made if for example, the DSP has insufficient available processing capacity (generally stated as available MIPS—million of instructions per second) or insufficient available memory, due to other tasks being executed by the DSP 16. The compiled code can be passed to the dynamic cross linker 82 for immediate use in the DSP 16, or could be saved in the DSP library 58.

The dynamic cross linker 82 accepts previously unlinked code, which is either (1) statically stored in connection with the host processor 12 or (2) dynamically downloaded to the host processor 12 over a network connection (including global networks such as the Internet) or (3) dynamically generated by the dynamic cross compiler 80. The dynamic cross linker 82 links the input code for a memory starting address of the DSP 16 determined at runtime. The memory starting address can be determined from a memory map or memory table stored on and managed by either the host processor 12 or DSP 16. The dynamic cross linker 82 converts referenced memory locations in the code to actual memory locations in the DSP. These memory locations could include, for example, branch addresses in the code or references to locations of data in the code.

In the preferred embodiment, the portable code is in a COFF (common object file format) which contains all information about the code, including whether it is linked or unlinked. If it is unlinked, symbol tables define the address which must be changed for linking the code.

The conversion process described above has several significant advantages over the prior art. First, the dynamic cross compiler 80 allows run-time decisions to be made about where to execute the downloaded portable code. For example, in a system with multiple target processors (such as two DSPs 16), the dynamic cross compiler 80 could compile the portable code to any one of the target processors based on available resources or capabilities. The dynamic cross linker 82 provides for linking code to run on a target processor which does not support relocatable code. Since the code is linked at run-time, memory locations in the DSP 16 (or other target processor) do not need to be reserved, allowing optimum efficiency of use of all computing resources in the device.

Because the compiling is accomplished with knowledge of the architecture of the platform 10, the compiling can take advantage of processor and platform specific features, such as intelligent cache architectures in one or both processors.

Thus, the DSP 16 can have various functions which are changed dynamically to fully use its processing capabilities. For example, the user may wish to load a user interface including voice recognition. At that time, the host processor could download software and dynamically cross compile and cross link the voice recognition software for execution in the DSP 16. Alternatively, previously compiled software in the DSP library 58 could be dynamically cross linked, based on the current status of the DSP 16, for execution.

Host Device Driver

The Host Device Driver handles communications from the DSP 16 to the Host 12. The driver functions takes the communication requests as specified in the Host-DSP Communications Protocol and handles transmission of the information via the available hardware interface. The device driver is RTOS dependent and communications hardware dependent.

Host-DSP Communications Protocol (Host-DSP Interface Layer)

The Host-DSP Communications Protocol governs the communications of commands and data between the Host 12 and the DSP 16. The communications consist of several paths: messages, data channels, and streams. Messages are used to send initialization parameters and commands to the tasks. Data channels carry large amounts of data between tasks and between the DSP 16 and Host 12, in the form of data frames. Streams are used to pass streamed data between tasks and between the DSP 16 and Host 12.

Messages

Each task has an entry point to a message handler, which handles messages. The messages are user defined and will include initialization parameters for the task's function, and commands for controlling the task. The tasks send messages to the Host 12 via the callback specified when the task is created. The prototype for the task's message handler and the prototype for the Host's callback are shown here:

void TaskMsgHandler(T_ReplyRef replyref, T_MsgID MsgID, T_Count count, T_DSP_Word *buf);

void HostCallBack(T_ReplyRef replyref, T_MsgID MsgID, T_Count count, T_DSP_Word *buf);

The replyref parameter refers to an implementation dependent reference value, which is used to route the reply back to the sender. For every Send_Message call, the recipient must call Reply_Message using the replyref parameter. The actual messages may appear as follows:

| Sent message: | MsgPktFlag | taskid | replyref | msgid | count | buf[...] |
|---|---|---|---|---|---|---|
| Reply message: | MsgPktFlag | −1 | replyref | msgid | count | buf[...] |

The multiword data is sent least-significant word first.

A TaskID of 0 in the Send_Message function indicates a system level message. The system level messages are used to implement the DSP-API functions Following are the Message functions:

Send_Message

BOOL Send_Message(T_TaskID TaskID, T_MsgID MsgID, T_Count count, T_DSP_Word *msgbuf, T_DSP_Word *replybuf, T_Size replybufsize, T_Count replycount, U16*errcode);

This function will send a user defined message to a task specified by TaskID. The MsgID defines the message, and the msgbuf contains the actual message data. The message size is count T_DSP_Words. The reply to the message will be contained in the replybuf parameter, which points to a buffer of size replybufsize, provided by the caller. It should be of sufficient size to handle the reply for the particular message. The errcode parameter will contain the following possible results:

DSP_SUCCESS
    DSP_DEVID_NOT_FOUND
    DSP_DEVID_NOT_RESPONDING
    DSP_TASK_NOT_FOUND

Reply_Message

BOOL Reply_Message(T_ReplyRef replyref, T_Count count, T_DSP_Word *buf, U16*errcode);

This function is used to reply to messages. The replyref parameter is a reference used to route the reply back to the sender of the original message, and is implementation specific. The reply is contained in the buf parameter and its size is count T_DSP_Words. The errcode parameter will contain the following possible results:

DSP_SUCCESS
    DSP_DEVID_NOT_FOUND
    DSP_DEVID_NOT_RESPONDING
    DSP_BAD_REPLY_REF

Channels

The concept of channels is used to transmit frame-based data from one processor to another, or between tasks on the same processor. When created, a channel allocates a specified number and size of frames to contain the data. Initially, the channel will contain a list of empty frames. Tasks that produce data will request empty frames in which to put the data, then once filled, the frame is returned to the channel. Tasks that consume data will request full frames from the channel, and once emptied, the frame is returned to the channel. This requesting and returning of frame buffers allows data to move about with a minimum of copying.

Each task has a specified Input and Output channel. Once a channel is created, it should be designated as the input to one task, and the output to another task. A channel's ID includes a device ID, so channels can pass data between processors. Channel data flow across the Host-DSP interface may appear as follows:

| ChanPktFlag | Channel ID | Count | Data[...] |
|---|---|---|---|

The following are the channel functions:

Create_Channel

BOOL Create_Channel(T_DeviceID DevID, T_Size framesize, T_Count numframes, T_ChanID *ChannelID, U16*errcode);

This function creates a data frame-based communication channel. This creates a channel control structure, which maintains control of a set of frame buffers, whose count and size are specified in the numframes and framesize parameters, respectively. When created, the channel allocates the data frames, and adds them to its list of empty frames. ChannelID will return the ID of the new channel. If the DevID is not that of the calling processor, a channel control structure is created on both the calling processor and the DevID processor, to control data flowing across the communications interface. The errcode parameter will contain the following possible results:

CHAN_SUCCESS
    CHAN_DEVID_NOT_FOUND
    CHAN_DEVID_NOT_RESPONDING
    CHAN_ALLOCATION_ERROR

Delete_Channel
BOOL Delete_Channel(T_ChanID ChannelID, U16*errcode);
This function deletes an existing channel specified by ChannelID. The errcode parameter will contain the following possible results:
CHAN_SUCCESS
CHAN_DEVID_NOT_FOUND
CHAN_DEVID_NOT_RESPONDING
CHAN_CHANNEL_NOT_FOUND
Request_Empty_Frame
BOOL Request_Empty_Frame(T_LocalChanID Chn, T_DSP_Word **bufptr, BOOL WaitFlag, U16*errcode);
This function requests an empty frame from the specified local channel ID. If Chn is NULL, then the task's output channel is used. Upon return, the bufptr parameter will contain the pointer to the frame buffer. If the WaitFlag is TRUE, and there is no frame buffer available, the caller will be suspended until a buffer becomes available. If the WaitFlag is FALSE, the function will return regardless. The errcode parameter will contain the following possible results:
CHAN_SUCCESS
CHAN_CHANNEL_NOT_FOUND
CHAN_BUFFER_UNAVAILABLE
Return_Full_Frame
BOOL Return_Full_Frame(T_LocalChanID Chn, T_DSP_Word *bufptr, U16 *errcode);
Once a task has filled a frame buffer, it returns is to the channel using this function. The buffer pointed to by bufptr is returned to the channel ID specified. If Chn is NULL, then the task's output channel is used. The errcode parameter will contain the following possible results:
CHAN_SUCCESS
CHAN_CHANNEL_NOT_FOUND
CHAN_BUFFER_CTRL_ERROR
Request_Full_Frame
BOOL Request_Full_Frame(T_LocalChanID Chn, T_DSP_Word **bufptr, BOOL WaitFlag, U16*errcode);
This function requests a full frame of data from the specified local channel ID. If Chn is NULL, then the task's input channel is used. Upon return, the bufptr parameter will contain the pointer to the frame buffer. If the WaitFlag is TRUE, and there are no full frame buffers available, the caller will be suspended until a buffer becomes available. If the WaitFlag is FALSE, the function will return regardless. The errcode parameter will contain the following possible results:
CHAN_SUCCESS
CHAN_CHANNEL_NOT_FOUND
CHAN_BUFFER_UNAVAILABLE
Return_Empty_Frame
BOOL Return_Empty_Frame(T_LocalChanID Chn, T_DSP_Word *bufptr, U16 *errcode);
Once a task has used the data from a frame buffer, it should return the buffer to the channel using this function. The buffer pointed to by bufptr is returned to the channel ID specified. If Chn is NULL, then the task's input channel is used. The errcode parameter will contain the following possible results:
CHAN_SUCCESS
CHAN_CHANNEL_NOT_FOUND
CHAN_BUFFER_CTRL_ERROR
Set_Task_Input_Channel
BOOL Set_Task_Input_Channel(T_Task *TaskID, T_ChanID ChanID, U16 *errcode);

This function sets a task's input channel to the specified channel ID. The errcode parameter will contain the following possible results:
CHAN_SUCCESS
CHAN_DEVID_NOT_FOUND
CHAN_DEVID_NOT_RESPONDING
CHAN_TASK_NOT_FOUND
CHAN_CHANNEL_NOT_FOUND
Set_Task_Output_Channel
BOOL Set_Task_Output_Channel(T_Task *TaskID, T_ChanID ChanID, U16 *errcode);
This function sets a task's output channel to the specified channel ID. The errcode parameter will contain the following possible results:
CHAN_SUCCESS
CHAN_DEVID_NOT_FOUND
CHAN_DEVID_NOT_RESPONDING
CHAN_TASK_NOT_FOUND
CHAN_CHANNEL_NOT_FOUND
Streams
Streams are used for data, which can not be broken into frames, but which continuously flow into and out of a task. A stream will consist of a circular buffer (FIFO) with associated head and tail pointers to track the data as it flows in and out. Each task can have a designated input and output stream. Stream data flow across the Host-DSP interface may appear as follows:

| StrmPktFlag | Stream ID | Count | Data[ . . . ] |
| --- | --- | --- | --- |

Following are the stream functions:
Create_Stream
BOOL Create_Stream(T_DeviceID DevID, T_Size FIFOsize, T_StrmID *StreamID, U16*errcode);
This function creates a FIFO-based communication stream. This creates a stream control structure, which maintains control of a FIFO of size FIFOsize. When created, the stream allocates an empty FIFO, and initializes head and tail pointers to handle data flow into and out of the stream. StreamID will return the ID of the new stream. If the DevID is not that of the calling processor, a stream control structure is created on both the calling processor and the DevID processor, to control data flowing across the communications interface. The errcode parameter will contain the following possible results:
STRM_SUCCESS
STRM_DEVID_NOT_FOUND
STRM_DEVID_NOT_RESPONDING
STRM_ALLOCATION_ERROR
Delete_Channel
BOOL Delete_Stream(T_StrmID StreamID, U16*errcode);
This function deletes an existing stream specified by StreamID. The errcode parameter will contain the following possible results:
STRM_SUCCESS
STRM_DEVID_NOT_FOUND
STRM_DEVID_NOT_RESPONDING
STRM_STREAM_NOT_FOUND
Get_Stream_Count
BOOL Get_Stream_Count(T_LocalStrmID StrmID, T_Count *count U16 *errcode);
This function requests the count of T_DSP_Words currently in the stream FIFO specified by StrmID. The count parameter will contain the number upon return. The errcode parameter will contain the following possible results:
STRM_SUCCESS
STRM_STREAM_NOT_FOUND
Write_Stream
BOOL Write_Stream(T_LocalStrmID Strm, T_DSP_Word *bufptr, T_Count count, T_Count *countwritten, U16*errcode);
This function will write count number of T_DSP_Words to the stream specified by the Strm. If Strm is NULL, the task's output stream is used. The data is pointed to by the bufptr parameter. Upon return, countwritten will contain the number of T_DSP_Words actually written. The errcode parameter will contain the following possible results:
STRM_SUCCESS
STRM_DEVID_NOT_FOUND
STRM_DEVID_NOT_RESPONDING
STRM_STREAM_NOT_FOUND
STRM_STREAM_OVERFLOW
Read_Stream
BOOL Read_Stream(T_LocalStrmID Strm, T_DSP_Word *bufptr, T_Count maxcount, BOOL WaitFlag, T_Count *countread, U16*errcode);
This function reads data from the stream specified by Strm. If Strm is NULL, the task's input stream is used. The data will be stored in the buffer pointed to by bufptr. Up to maxcount T_DSP_Words will be read from the stream. The countread parameter will contain the actual count of the data read. The errcode parameter will contain the following possible results:
STRM_SUCCESS
STRM_DEVID_NOT_FOUND
STRM_DEVID_NOT_RESPONDING
STRM_STREAM_NOT_FOUND
Set_Task_Input_Stream
BOOL Set_Task_Input_Stream(T_Task *TaskID, T_StrmID StrmID, U16 *errcode);
This function sets a task's input stream to the specified stream ID. The errcode parameter will contain the following possible results:
STRM_SUCCESS
STRM_DEVID_NOT_FOUND
STRM_DEVID_NOT_RESPONDING
STRM_TASK_NOT_FOUND
STRM_STREAM_NOT_FOUND
Set_Task_Output_Stream
BOOL Set_Task_Output_Stream(T_Task *TaskID, T_StrmID StrmID, U16 *errcode);
This function sets a task's output stream to the specified stream ID. The errcode parameter will contain the following possible results:
STRM_SUCCESS
STRM_DEVID_NOT_FOUND
STRM_DEVID_NOT_RESPONDING
STRM_TASK_NOT_FOUND
STRM_STREAM_NOT_FOUND
Data Types
Data types used herein are defined in Table 3:

TABLE 3

| Symbol | Description |
| --- | --- |
| S8 | Signed 8-bit integer. |
| U8 | Unsigned 8-bit integer. |
| S16 | Signed 16-bit integer. |
| U16 | Unsigned 16-bit integer. |
| S32 | Signed 32-bit integer. |

TABLE 3-continued

| Symbol | Description |
| --- | --- |
| U32 | Unsigned 32-bit integer. |
| T_HostWord | A word on the Host processor. |
| T_DSP_Word | A word on the DSP processor. |
| BOOL | Boolean value (TRUE or FALSE). |
| T_HostPtr | Pointer on the Host processor. |
| T_DSP_Ptr | Pointer on the DSP processor. |
| T_DeviceID | Processor device ID. |
| T_TaskID | A structure containing fields for a device ID and a processor local task ID. |
| T_ChanID | A structure containing fields for a device ID and a processor local channel ID. |
| T_MsgID | Message ID. |
| T_DSP_ID | An object ID on the DSP. |
| T_Count | Data type for a count. |
| T_Size | Data type for a size. |
| T_HostCallBack | Value used when tasks send message back to the Host. |
| T_ReplyRef | Message reply reference. |
| T_LocalTaskID | Local task ID. |
| T_LocalChanID | Local channel ID. |
| T_DSP_Name | Name for DSP objects (RTOS dependent). |
| T_CodeHdr | Code header structure for a DSP Library entry. |
| T_TaskCreate | Task creation structure. |

System Messages

These tables define the messages passing between devices (i.e. Host to DSP 16). The device IDs presented as parameters in the corresponding function calls are not incorporated in the messages since they are used to actually route the message to the device. Similarly, task IDs that include a device ID as their upper half for the function call will not include the device ID in the message, but only the DSPs local task ID portion.

TABLE 4

DSP-API Messages

| Message | Send Parameters | Reply Parameters | Direction Host ↔ DSP |
| --- | --- | --- | --- |
| GET_MIPS | None | U32 mips | → |
| GET_MEM_AVAIL | | T_Size progmem T_Size datamem | → |
| ALLOC_MEM | U16 mempage T_Size size | T_DSP_Word *memptr U16 errcode | → |
| FREE_MEM | U16 mempage T_DSP_Word *memptr | U16 errcode | → |
| PUT_BLOB | T_DSP_Ptr destaddr U16 mempage T_Size size T_DSP_Word BLOB[size] | U16 errcode | → |
| CREATE_TASK | T_TaskCreate tcs | T_TaskID TaskID U16 errcode | → |
| START_TASK | T_TaskID TaskID | U16 errcode | → |
| SUSPEND_TASK | T_TaskID TaskID | U16 errcode | → |
| RESUME_TASK | T_TaskID TaskID | U16 errcode | → |
| DELETE_TASK | T_TaskID TaskID | U16 errcode | → |
| CHANGE_PRIORITY | T_TaskID TaskID U16 newpriority | U16 oldpriority U16 errcode | → |
| GET_TASK_STATUS | T_TaskID TaskID | U16 status U16 priority T_ChanID Input T_ChanID Output U16 errcode | → |

TABLE 4-continued

DSP-API Messages

| Message | Send Parameters | Reply Parameters | Direction Host ↔ DSP |
|---|---|---|---|
| GET_ID | T_DSP_Name Name | T_DSP_ID ID U16 errcode | → |

TABLE 5

DSP Interface Layer/Channel Interface Layer Messages

| Message | Send Parameters | Reply Parameters | Direction Host ↔ DSP |
|---|---|---|---|
| CREATE_CHANNEL | T_Size framesize T_Count numframes | T_ChanID ChannelID U16 errcode | → |
| DELETE_CHANNEL | T_ChanID ChannelID | U16 errcode | → |
| CREATE_STREAM | T_Size FIFOsize | T_StrmID StreamID U16 errcode | → |
| DELETE_STREAM | T_StrmID StreamID | U16 errcode | → |

TABLE 6

Debug Messages

| Message | Send Parameters | Reply Parameters | Direction Host ↔ DSP |
|---|---|---|---|
| READ_MEM | U16 mempage T_DSP_Ptr addr T_Count count | T_DSP_Word mem[count] U16 errcode | → |
| WRITE_MEM | U16 mempage T_DSP_Ptr addr T_Count count T_DSP_Word mem[count] | U16 errcode | → |
| READ_REG | U16 RegID | DSP_WORD regvalue U16 errcode | → |
| WRITE_REG | U16 RegID T_DSP_Word regvalue | U16 errcode | → |
| SET_BREAK | T_DSP_Ptr addr | U16 errcode | → |
| CLR_BREAK | T_DSP_Ptr addr | U16 errcode | → |
| BREAK_HIT | T_DSP_Ptr addr | U16 ACK | ← |

Downloading Native Code

Figure 4:
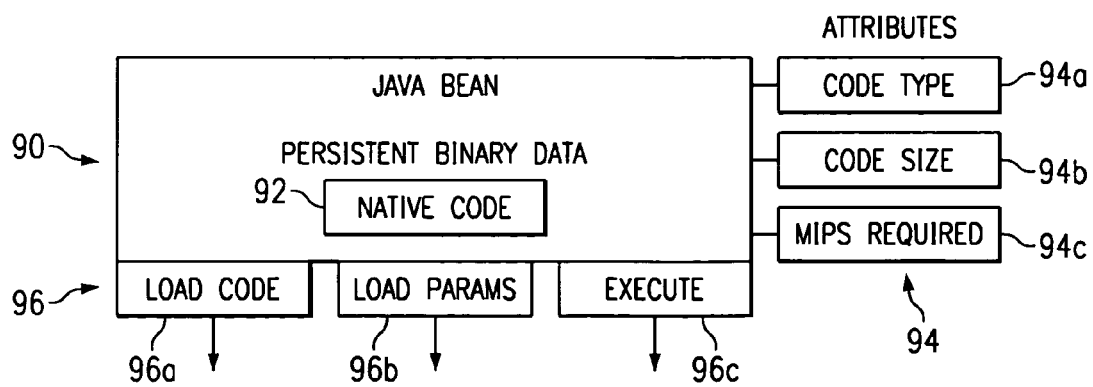
FIG. 4 illustrate an embodiment of native code for execution on a processor being encapsulated in a JAVA Bean wrapper for downloading to a device.
Figure 5:
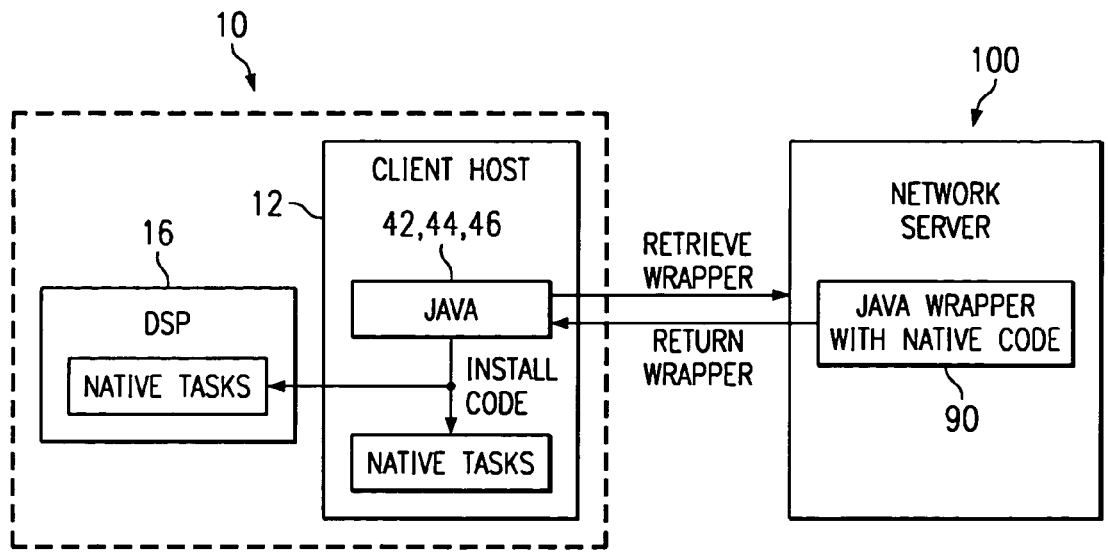
FIG. 5 illustrates the operation of transferring the encapsulated native code to a processor on a device from a JAVA Bean located on a remote server.
Figure 6:
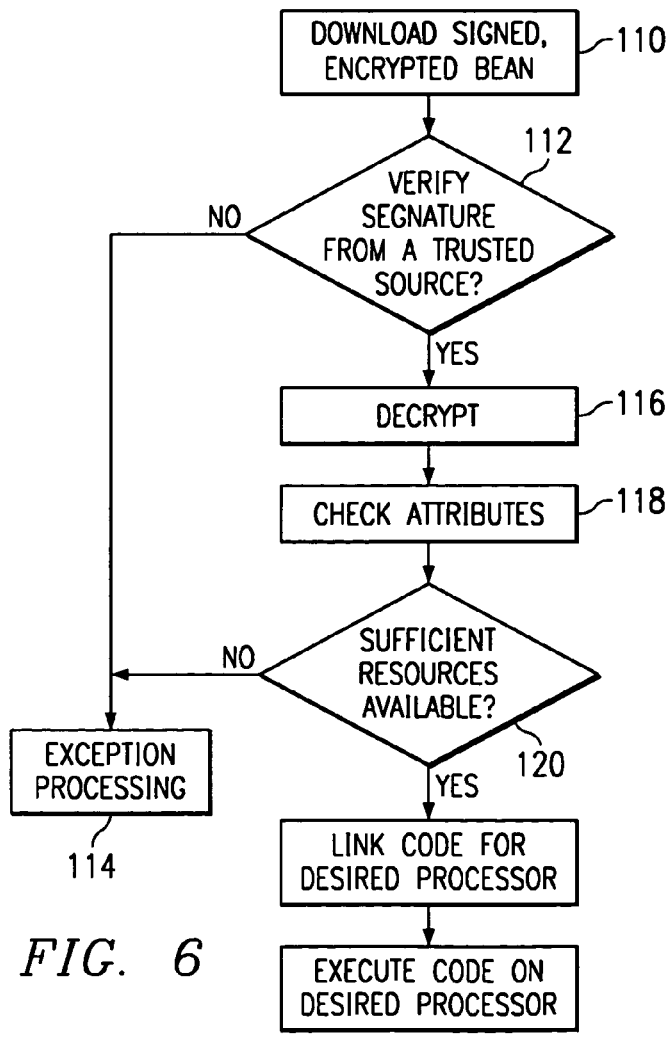
FIG. 6 illustrates a flow diagram describing security features associated with the operation of FIG. 5.

FIGS. 4-6 illustrate an embodiment for downloading native code to a target processor (i.e., the host 12 or DSP 16) in a secure and efficient manner. This embodiment for downloading code could be used, for example, in downloading code from the Internet, or other global network, from a Local or Wide Area Network, or from a peripheral device, such as a PC Card or Smartcard.

In FIG. 4, an embodiment of a JAVA Bean 90 is shown, where the Bean 90 acts as a wrapper for native code 92. The Bean further includes several attributes 94, listed as a Code Type attribute 94a, a Code Size attribute 94b and a MIPS Required attribute 94c. The Bean 90 has several actions 96, including a Load Code action 96a, a Load Parameters action 96b and an Execute Parameter 96c.

In operation, the Load Code action 96a is used to load external native code (native to the target processor) into the Bean. Since JAVA Beans have persistence, the Bean 90 can store its internal state, including the native code 92 and the attributes 94. The Load Parameters action 96b retrieves parameters from the native code 92 (using, for example, the COFF file format described above) and stores the parameters as attributes 94a-c. The Execute action 96c executes tasks installed in the DSP 16.

FIG. 5 illustrates use of the Bean 90 to download code to the target processor. In this example, it is assumed that the target processor is the DSP 16 (or one of multiple DSPs 16), although it could be used to download native code to the host processor 12 as well. Further, it is assumed that the desired Bean 90 is resident in a network server, such as a LAN server or an Internet server, although the Bean could be resident in any device in communication with the platform 10, such as a Smartcard. For a wireless data platform 10, the connection to the network server 100 will often be wireless.

In FIG. 5, the platform 10 is coupled to a network server 100. The host processor 12, as shown in greater detail in FIG. 2, may execute one or more JAVA applets 40 through a JAVA virtual machine 44. In order to download new code, the host 12 loads an applet containing the Bean 90 from the network server 100 or the Bean, without the containing applet, can be downloaded from the server 100. Once the wrapper Bean 90 has been retrieved, it can be queried for the size of the native code, code type (for which processor is the code intended) and MIPs required. If the intended processor has sufficient resources to run the code 92, the code 92 can be installed to execute on the intended processor, either the host processor 12 or DSP 16 in the architecture shown in FIG. 5. Typically, the native code 92 will be unlinked, compiled code. Thus, the cross linker 82 of the DSP-API 50 will link the code to an available memory location. The Bean would pass the binary native code 92 to the dynamic cross linker 82, which would install and execute the code.

A typical manner in which a download of native code might occur is when the user is running an applet in which a DSP function is desired. First, the applet would check to see if the desired code was installed as a task 60 in the DSP or was available in the DSP Library 58. If so, the task could be executed without a download.

If the task is not stored in the DSP 16 or the DSP library 58, an object (referred to as the "DSPLoader" object herein) could be created to load the Bean 90. If the DSPLoader class is local on the host 12, JAVA will check to see if the Bean is available locally as well. In a first instance, there may be a Bean with the code stored locally. If so, the code from the Bean is installed to the DSP (or to whichever processor specified by the Code Type). If a Bean without the code is stored locally, the Bean can retrieve the code from the appropriate server.

On the other hand, if the DSPLoader object is not local, then JAVA will load the Bean 90 from the server that wrote the applet. The code from the Bean will then be installed as described above.

While the downloading of native code is described in connection with the use of a JAVA Bean, it could also be accomplished by wrapping the code within another language, such as an ActiveX applet.

Using a JAVA Bean (or other applet) as a wrapper to the native code has significant advantages. First, it allows a simple, standard method for loading code onto one of a plurality of processors. The Bean is created, code is loaded into the Bean and the code is linked to the appropriate processor. Without wrapping the code within the Bean, the process may take several hundred steps. Second, it allows multiple pieces of native code to be combined by a single applet, providing for complex applications to be generated from multiple discrete routines using a single applet to combine the routines as desired. Third, it takes advantage of the language's security features, thereby protecting not only the JAVA code in the Bean 90, but the native code 92 as well. Other languages, such as ActiveX, have security features as well.

Security

Two of the most important security features are digital signing and encryption. A JAVA Bean or ActiveX applet may be signed by the source of the code; when the Bean or applet is downloaded, the signature is verified by the receiving application, which has a list of trusted sources. If the Bean or applet is signed by a trusted source, it can be decrypted using standard techniques. Accordingly, the native code is encrypted during transmission along with the code of the Bean or applet, preventing unauthorized modification of the code. Because the native code is secure and comes from a trusted source, the attributes can also be trusted as accurate.

FIG. 6 illustrates a flow chart describing the process of downloading native code for a processor using a JAVA Bean, it being understood that the native code could be wrapped in an applet of a different language using similar techniques. In step 110, the encrypted, digitally signed Bean 90 is downloaded to a device running a JAVA virtual machine. In step 112, the signature is verified. If it is not from a source listed as a trusted source, exception processing is enabled in step 114. In the case of the Bean coming from a trusted source, the exception processing function may give the user an opportunity to accept the Bean, if the user is comfortable with the source. If the signature is invalid, the exception processing may delete the Bean 90 and send an appropriate error message to the user.

If the signature is valid and comes from a trusted source, the Bean is decrypted in step 116. This step decrypts both the JAVA code and the native code in the Bean. In step 118, the attributes are retrieved from the Bean 90 and in step 120 the applet determines whether the appropriate processor has sufficient resources to run the code. If not, the exception processing step 114 may decline to install the native code, or steps may be taken to free resources. If there are sufficient resources, the code is linked using the cross-linker and installed on the desired processor in step 122. In step 124, the native code is executed.

Sample JAVA script for a Bean 90 is provided hereinbelow:

```
package ti.dsp.loader;
import java.awt.*;
import java.io.*;
import java.net.*;
public class NativeBean extends Canvas implements Serializable
{
  public NativeBean( ) {
    setBackground(Color.white);
    funcData = new ByteArrayOutputStream( );
    try {
      funcCodeBase = new URL("http://localhost");
    }
    catch (MalformedURLException e) {
    }
  }
  public Dimension getMinimumSize( ) {
    return new Dimension(50, 50);
  }
  public void loadCode( ) {
    URL baseURL = null;
    try {
      baseURL = new URL(funcCodeBase.toString( ) + "/" + myFunction);
    }
    catch (MalformedURLException e) {
    }
    DataInputStream source = null;
    int read;
    byte[] buffer;
    buffer = new byte[1024];
    try {
      source = new DataInputStream(baseURL.openStream( ));
    }
    catch (IOException e) {
      System.out.println("IOException creating streams: " + e);
    }
    codeSize = 0;
    funcData.reset( );
    try {
      while (true) {
        read = source.read(buffer);
        if (read == -1)
          break;
        funcData.write(buffer, 0, read);
      }
    }
    catch (IOException e) {
      System.out.println("IOException: " + e);
    }
    codeSize = funcData.size( );
    System.out.println("Code size = " + codeSize);
    try {
      source.close( );
    }
    catch (IOException e) {
      System.out.println("IOException closing: " + e);
    }
  }
  public synchronized String getFunctionName( ) {
    return myFunction;
  }
  public void setFunctionName(String function) {
    myFunction = function;
  }
  public synchronized String getCodeBase( ) {
    return funcCodeBase.toString( );
  }
  public void setCodeBase(String newBase) {
    try {
      funcCodeBase = new URL(newBase);
    }
    catch (MalformedURLException e) {
    }
  }
  public void installCode( ) {
    FileOutputStream destination = null;
    File libFile = new File(myFunction);
    try {
      destination = new FileOutputStream(libFile);
    }
    catch (IOException e) {
      System.out.println("IOException creating streams: " + e);
    }
    if (destination != null) {
      try {
        funcData.writeTo(destination);
      }
      catch (IOException e) {
        System.out.println("IO Exception installing native code: " + e);
      }
    }
  }
  linkCode(funcData)
  public void loadParameters( ) {
  }
  public void execute( ) {
  }
  public synchronized int getCodeSize( ) {
    return codeSize;
  }
  public synchronized int getCodeType( ) {
    return codeType;
  }
  public void setCodeType(int newType) {
    codeType = newType;
  }
  private int codeSize = 0;
```

```
private int codeType = 1;
private String myFunction = "";
private URL funcCodeBase = null;
private ByteArrayOutputStream funcData = null;
}
```

In the script set forth above, the NativeBean( ) routine creates the Bean 90 which will hold the native code. The loadCode( ) routine gets the native code from the server. The getFunctionName( ) and getCodeBase( ) routines retrieve attributes. The installCode( ) routine calls the cross linker to link the native code to the DSP and to load the linked code. The loadParameters( ) routine instructs the Bean to examine the native code and determine its attributes. The getCodesize( ) and getCodetype( ) routines transfer the attributes to the requesting applet.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A mobile electronic device, comprising:
a digital signal coprocessor for executing native code; and
a host processor coupled to said digital signal coprocessor and operable to execute native code corresponding to the host processor and processing independent code, said host processor operable to provide the code executed by the digital signal coprocessor at runtime.

2. The mobile electronic device of claim 1 wherein the processor independent code is portable.

3. The mobile electronic device of claim 1 wherein the host processor can generate native code for the digital signal coprocessor.

4. The mobile electronic device of claim 1 wherein the host processor can generate native code for the digital signal coprocessor by compiling processor independent source code.

5. The mobile electronic device of claim 4 wherein the host processor compiles identified blocks of source code.

6. The mobile electronic device of claim 4 wherein the host processor identifies blocks of source code, which could be executed on the digital signal coprocessor and compiles the blocks of code.

7. The mobile electronic device of claim 1 by further comprising a memory storing a library of routines, which can be downloaded to the digital signal coprocessor for execution.

8. The mobile electronic device of claim 1 by further comprising a hardware language accelerator.

9. The mobile electronic device of claim 8 wherein the hardware accelerator comprises an accelerator for processor independent code.

10. The mobile electronic device of claim 1 by further comprising network interface circuitry for receiving data from a network.

11. The mobile electronic device of claim 10 wherein the network interface circuitry receives the data from the network via wireless communication.

12. The electronic device of claim 11 wherein said network interface circuitry comprises circuitry for interfacing with a global network.

13. The mobile electronic device of claim 1 wherein the host processor loads-tasks into the digital signal coprocessor.

14. The mobile electronic device of claim 1 wherein the host processor schedules tasks performed by the digital signal coprocessor.

15. The mobile electronic device of claim 1 wherein the host processor loads tasks into the digital signal coprocessor and scheduling tasks performed by the digital signal coprocessor.

16. The mobile electronic device of claim 15 wherein the host processor controls and communicates with the tasks.

17. The mobile electronic device of claim 1 wherein the host processor loads tasks into memory of the digital signal coprocessor and unloads tasks from the memory of the digital signal coprocessor.

18. The mobile electronic device of claim 1 wherein the providing the code executed by the digital signal coprocessor is a run-time decision by the host processor.

19. The mobile electronic device of claim 1 wherein the host processor loads processor independent code into the digital signal coprocessor.

20. A method of controlling a mobile electronic device comprising the steps of:
executing native code in a digital signal coprocessor;
executing both native code and processor independent code in a host processor;
providing the code executed by the digital signal coprocessor at runtime with the host processor; and
communicating between said host processor and said digital signal coprocessor.

21. The method of claim 20 by further comprising the step of generating native code for the digital signal coprocessor in the host processor.

22. The method of claim 21 wherein the step of generating native code comprises the step of generating native code by compiling processor independent source code.

23. The method of claim 22 by further comprising the step of identifying blocks of the source code to compile for execution on the digital signal coprocessor.

24. The method of claim 20 by further comprising the steps of storing a library of routines for downloading from the host processor to the digital signal coprocessor for execution.

25. The method of claim 20 by further comprising the step of receiving code through a network interface.

26. The method of claim 25 by further comprising the step of receiving code through a wireless network interface.

27. The method of claim 25 by further comprising the step of receiving code through a wireless network interface from a global network.

28. The method of claim 20 wherein the host processor loads tasks into the digital signal coprocessor.

29. The method of claim 20 wherein the host processor schedules tasks performed by the digital signal coprocessor.

30. The method of claim 20 wherein the host processor loads tasks into the digital signal coprocessor and schedules tasks performed by the digital signal coprocessor.

31. The method of claim 30 wherein the host processor controls and communicates with the tasks.

32. The method of claim 20 wherein the host processor loads tasks into memory of the digital signal coprocessor and unloads tasks from the memory of the digital signal coprocessor.

33. The method of claim 20 wherein the providing the code executed by the digital signal coprocessor is a run-time decision by the host processor.

34. The method of claim 20 wherein the host processor loads processor independent code into the digital signal coprocessor.

35. A mobile electronic device, comprising:
a plurality of digital signal coprocessors; and
a host processor coupled to said digital signal coprocessors and operable to:
execute source code;
identify one or more sections of source code to be executed on one or more of said digital signal coprocessors; and for each identified section of source code, determining a corresponding digital signal coprocessor; and for each identified section of source code, compile said identified section of source code into the native code associated with said corresponding digital signal coprocessor and provide said native code onto said corresponding digital signal coprocessor at runtime.

36. A method of controlling a mobile electronic device, comprising:
executing source code on a host processor;
identifying one or more sections of source code to be executed on one or more digital signal coprocessors; and
for each identified section of source code, determining a corresponding digital signal coprocessor; and
for each identified section of source code, compiling said identified section of source code into the native code onto said corresponding digital signal coprocessor;
the host processor providing the native code to the digital signal coprocessor at runtime; and
communicating between said host processor and said digital signal coprocessor.

37. A method, comprising steps of:
executing processor independent bytecodes on a host processor; and
using said host processor to configure and provide native digital signal processor (DSP) code to a DSP coprocessor at runtime.

38. A method, comprising the steps of:
configuring native digital signal processor (DSP) code on a host processor executing processor independent bytecodes; and providing said configured native DSP code from said host processor to a DSP coprocessor at runtime.

39. A mobile electronic device, comprising:
a digital signal coprocessor for executing processor dependent code; and
a host processor coupled to said digital signal coprocessor; said host processor operable to execute processor dependent code and processor independent code, said host processor operable to use said processor dependent code and processor independent code to provide said processor dependent code to the digital signal coprocessor at runtime.

40. The mobile electronic device of claim 39 wherein the host processor loads tasks into the digital signal coprocessor.

41. The mobile electronic device of claim 39 wherein the host processor schedules tasks performed by the digital signal coprocessor.

42. The mobile electronic device of claim 39 wherein the host processor loads tasks into the digital signal coprocessor and schedules tasks performed by the digital signal coprocessor.

43. The mobile electronic device of claim 42 wherein the host processor controls and communicates with the tasks.

44. The mobile electronic device of claim 39 wherein the host loads tasks into memory of the digital signal coprocessor and unloads tasks from the memory of the digital signal coprocessor.

45. The mobile electronic device of claim 39 wherein the providing the code executed by the digital signal coprocessor is a run-time decision by the host processor.

46. The mobile electronic device of claim 39 wherein the host processor loads processor independent code into the digital signal coprocessor.

* * * * *

UNITED STATES PATENT AND TRADEMARK OFFICE
CERTIFICATE OF CORRECTION

PATENT NO.         : 8,489,860 B1  
APPLICATION NO.    : 08/995606  
DATED              : July 16, 2013  
INVENTOR(S)        : Michael McMahan et al.

Page 1 of 1

It is certified that error appears in the above-identified patent and that said Letters Patent is hereby corrected as shown below:

On the Title Page, Item (54) and in the specification, Column 1, line 3, in the title:
"CANGING" should instead be --CHANGING--.

On the Title Page, Item (75) the inventor name "Michael McMahon" should instead be --Michael McMahan--.

In the Claims:

Column 21, line 31, "processing" should instead be --processor--.

Signed and Sealed this  
Third Day of September, 2013

Teresa Stanek Rea  
*Acting Director of the United States Patent and Trademark Office*